K. H. JOHANSSON.
COMBINED CLUTCH AND BEARING.
APPLICATION FILED JAN. 25, 1916.
1,205,544.
Patented Nov. 21, 1916.
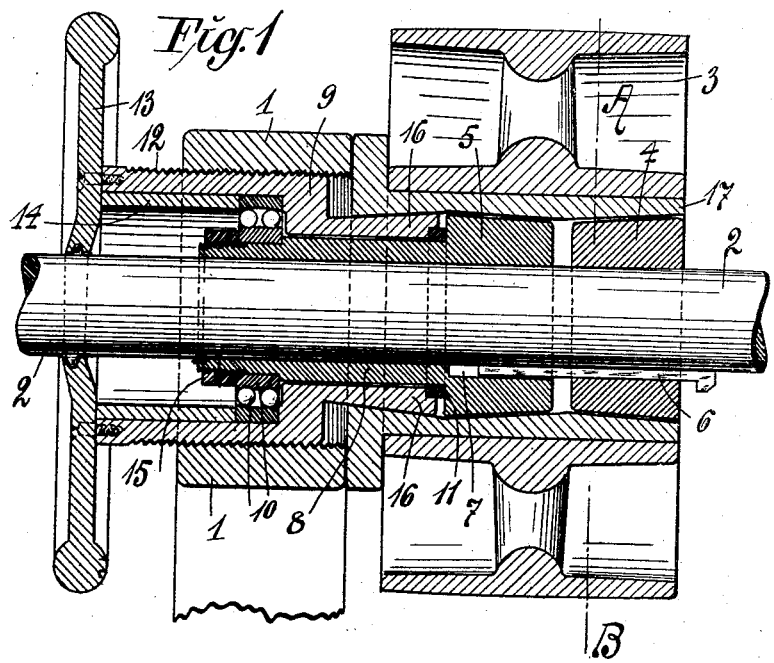
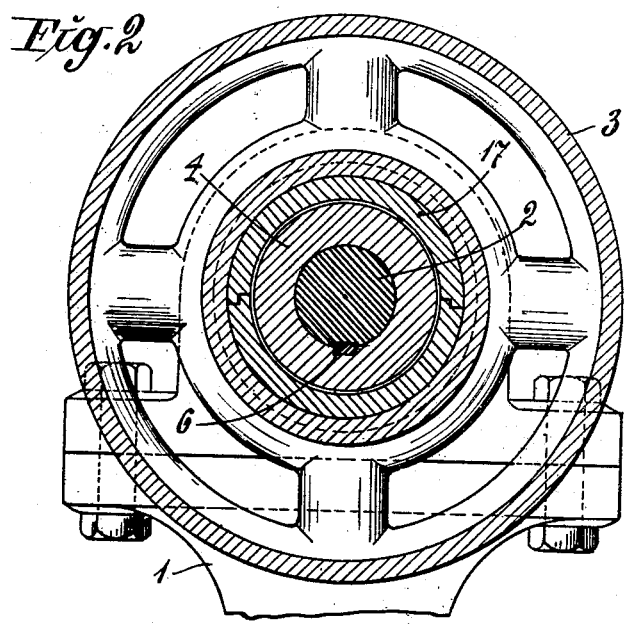
INVENTOR:
K. H. JOHANSSON
BY
ATTORNEY

UNITED STATES PATENT OFFICE.

KLAS HERMAN JOHANSSON, OF SÄFSJÖ, SWEDEN, ASSIGNOR TO AKTIEBOLAGET LINDÉNS HEMMASKINER, OF NÄSSJÖ, SWEDEN, A CORPORATION OF SWEDEN.

COMBINED CLUTCH AND BEARING.

1,205,544.  Specification of Letters Patent.  Patented Nov. 21, 1916.

Application filed January 25, 1916. Serial No. 74,103.

*To all whom it may concern:*

Be it known that I, KLAS HERMAN JOHANSSON, a subject of the King of Sweden, and resident of Säfsjö, in the Kingdom of Sweden, have invented certain new and useful Improvements in Combined Clutches and Bearings, of which the following is a specification, reference being had therein to the accompanying drawing.

This invention relates to a bearing for driving shafts or motion transmitting shafts, which is provided with a coupling device for bringing into or out of action a rope or belt pulley, a toothed wheel or the like.

A form of the invention is shown as an example in the accompanying drawing, in Figure 1 in a vertical section and in Fig. 2 in a cross section on the line A to B of Fig. 1.

1 is a stationary bearing block, 2 a continually rotating driving shaft and 3 a pulley which is connected with the said shaft or disconnected from the same by means of a coupling device arranged in accordance with this invention. On the shaft two somewhat conical sleeves 4 and 5 are located the narrower ends of which face one another. The sleeve 4 is firmly fixed to the shaft 2 by means of a key 6, while the sleeve 5 can slide on the shaft but not rotate on the same, for which purpose the inner end of the key 6 extends into a longitudinal groove 7 provided in the sleeve 5. The said sleeve 5 has a narrow cylindrical part 8, rotating in a sleeve 9. A ball race bearing 10 is provided between the sleeves 5 and 9 at the end of the narrow part 8 of the sleeve 5, while an end thrust bearing ring 11 of metal is provided between the inner end of the sleeve 9 and the shoulder of the sleeve 5. An end thrust ball bearing may be substituted for the said ring 11 for large coupling devices. The sleeve 9 has a cylindrical part 12, which is in screw threaded engagement with the inner side of the bearing block 1. A hand wheel 13 is fixed to the outer end of the cylindrical part 12 of the sleeve 9, by means of which the sleeve can be screwed into the bearing block 1 or out of the same. Inside the cylindrical part 12 of the sleeve 9 a ring 14 is located, which forces the outer ring of the said ball bearing against the shoulder of the sleeve 9. A ring 15 is in screw threaded engagement with the outer end of the sleeve 5 and forces the inner ring of the ball bearing against a shoulder on the said sleeve. The inner end part 16 of the sleeve 9 has a considerably shorter diameter than the part 12 of the said sleeve 9 and is somewhat conical, increasing in width toward its inner end. The sleeves 4, 5 and the conical part 16 are inclosed by the hub of the belt pulley 3 or by a lining 17 provided in the same, the inner shape of which corresponds to the conicity of the sleeves 4, 5 and the part 16.

The described coupling device acts in the following manner. In the drawing the said pulley is disengaged from the sleeves 4, 5 rotating with the shaft 2 and is carried by the part 16 of the stationary sleeve 9. For bringing the sleeves 4, 5 into engagement with the pulley, the hand wheel 13 is rotated in such direction, that the sleeve 9 is moved inward in the bearing block 1. This results in the sleeve 5 being moved toward the sleeve 4 and, owing to its conical shape, being forced against the lining 17, which in its turn is forced against the sleeve 4, so that the pulley 3 is connected with the sleeves 4, 5 and consequently with the rotating shaft 2. The conicity of the parts is so adapted, that the said connection is effected softly and without shocks. Owing to the conical shape of the part 16 the distance between the said part and the lining 17 is increased as the sleeve 9 is moved inward, in consequence whereof the pulley with its lining will rotate without being in contact with any stationary part. The disconnection is effected by rotating the hand wheel 13 in opposite direction, so that the sleeve 9 and consequently the sleeve 5 are moved away from the sleeve 4 and the pulley 3 is released. While the sleeve 9 is screwed outward, the conical part 16 of the same is forced against the corresponding part of the lining 17 and thus brakes the pulley, which is desirable for instance when the pulley drives a lathe for wood. During the disconnecting operation a space is effected between the sleeves 4, 5 and the lining 17, so that the shaft together with the sleeves rotates without the latter being in contact with the pulley or its lining.

When the coupling device is used for bringing machine tools into and out of action, it is mounted preferably on the main shaft rotating at suitable speed, the belt being located on the pulley 3 and the pulley of the machine tool. A cone pulley may be substituted for the pulley 3, if wanted. If the main shaft, on which the coupling device is mounted, is located at such a high level, that the operator can not reach the wheel 13 by his hand, the said wheel 13 may be provided with a groove for a rope or the like, which may be wound around a similar wheel provided at the machine tool, so that the coupling device is brought into and out of operation by pulling the rope in the one or the other direction.

When using the coupling device described above all other motion transmitting parts are rendered superfluous and the power can be used directly and without any reduction caused by motion transmitting shafts or the like. Consequently, the coupling device, which is simple and requires small space, saves power in a great degree.

Having now described my invention, what I claim as new and desire to secure by Letters Patent is:

1. In a combined bearing and coupling device for a rope or belt pulley, toothed wheel or the like, the combination of a continually rotating driving shaft, two conical parts, provided on the said driving shaft and coöperating with the hub of the pulley, one of the said parts being fixed to the said driving shaft and the other sliding on the same, a stationary bearing block, and a mechanism, supported by and engaging said block, by means of which the slidable part is brought into and out of engagement with the hub of the said pulley for connecting the pulley with the shaft and disconnecting the same respectively, said shaft passing entirely through said block and mechanism.

2. In a combined bearing and coupling device for a rope or belt pulley, toothed wheel or the like, the combination of a continually rotating driving shaft, a stationary bearing block, two conical parts, provided on the said driving shaft and coöperating with the hub of the pulley, one of the said parts being fixed to the said driving shaft and the other one sliding on the same, a sleeve which is in screw-threaded engagement with the bearing block, means connecting the said sliding part with the said sleeve in such manner, that the part can rotate but not slide with relation to the sleeve and means for rotating the said sleeve for bringing the sliding part into engagement with the hub of the pulley and out of engagement with the same, said shaft passing through said block and sleeve, substantially as described and shown in the drawing.

3. In a combined bearing and coupling device for a rope or belt pulley, toothed wheel or the like the combination of a continually rotating driving part, two conical parts provided on the said driving part and coöperating with the hub of the pulley, one of the said parts being fixed to the said driving part and the other one sliding on the same, a sleeve, which is in screw-threaded engagement with the bearing block, means connecting the said sliding part with the said sleeve in such manner, that the part can rotate but not slide with relation to the sleeve, means for rotating the said sleeve for bringing the sliding part into engagement with the hub of the pulley and out of engagement with the same, and a conical extension of the said sleeve increasing in width inward and coöperating with a corresponding conical part of the hub of the pulley in such manner, that it is out of engagement with the pulley, as the latter is connected with the shaft, but is brought into engagement with the pulley, as the latter is disengaged from the shaft, substantially as described and for the purpose set forth.

In witness whereof, I have hereunto signed my name.

KLAS HERMAN JOHANSSON.